(12) United States Patent
Elliott et al.

(10) Patent No.: US 7,805,439 B2
(45) Date of Patent: Sep. 28, 2010

(54) METHOD AND APPARATUS FOR SELECTING DATA RECORDS FROM VERSIONED DATA

(75) Inventors: Dale N. Elliott, San Jose, CA (US); Lynn LeBaron, Highland, UT (US)

(73) Assignee: Intuit Inc., Mountain View, CA (US)

( * ) Notice: Subject to any disclaimer, the term of this patent is extended or adjusted under 35 U.S.C. 154(b) by 246 days.

(21) Appl. No.: 11/493,731

(22) Filed: Jul. 26, 2006

(65) Prior Publication Data
US 2008/0027902 A1   Jan. 31, 2008

(51) Int. Cl.
*G06F 17/30* (2006.01)

(52) U.S. Cl. .................. 707/726; 728/749; 728/752
(58) Field of Classification Search .............. 707/3, 707/10, 104.1, 203
See application file for complete search history.

(56) References Cited

U.S. PATENT DOCUMENTS

| | | | |
|---|---|---|---|
| 6,012,055 A * | 1/2000 | Campbell et al. | 707/999.005 |
| 6,584,476 B1 * | 6/2003 | Chatterjee et al. | 707/999.203 |
| 7,698,348 B2 * | 4/2010 | Walker et al. | 707/790 |
| 2002/0099720 A1 * | 7/2002 | Bansal | 709/203 |
| 2004/0064442 A1 * | 4/2004 | Popovitch | 707/3 |
| 2004/0088334 A1 * | 5/2004 | Klein | 707/203 |
| 2005/0055385 A1 * | 3/2005 | Sinha et al. | 707/203 |
| 2007/0043715 A1 * | 2/2007 | Kaushik et al. | 707/4 |
| 2007/0150385 A1 * | 6/2007 | Ode | 705/30 |
| 2007/0162441 A1 * | 7/2007 | Idicula et al. | 707/5 |

* cited by examiner

*Primary Examiner*—Charles Rones
*Assistant Examiner*—Rezwanul Mahmood
(74) *Attorney, Agent, or Firm*—Park, Vaughan & Fleming LLP

(57) ABSTRACT

One embodiment of the present invention provides a system that selects data records from versioned data. The system operates by receiving a query from a client to select data records from a data source that match a criteria specified by the query. Note that the data source includes at least one data record which has been modified at least one time, to create multiple versions of the data record. The system performs the query on the data source, which includes performing the query on multiple versions of the data record. Finally, the system returns results of the query to the client.

21 Claims, 4 Drawing Sheets

---

Created 1/1/06 8:00:00am
Created by user: Tony
Transaction Date: 1/1/06
Number: 100
Payee: Staples
Amount: $100.00
Credit: Checking
Debit: Cost of Goods Sold

DATA RECORD 100 VERSION 1

Edited 1/2/06 8:00:00am
Edited by user: Tony
Transaction Date: 1/1/06
Number: 100
Payee: Staples
Amount: $150.00 [Changed]
Credit: Checking
Debit: Cost of Goods Sold

DATA RECORD 100 VERSION 2

Edited 1/3/06 8:00:00am
Edited by user: Cheryl
Transaction Date: 1/1/06
Number: 100
Payee: Staples
Amount: $150.00
Credit: Checking
Debit: Office Supplies [Changed]

DATA RECORD 100 VERSION 3

Edited 1/4/06 8:00:00am
Edited by user: Nick
Transaction Date: 1/1/06
Number: 100
Payee: Office Depot [Changed]
Amount: $150.00
Credit: Checking
Debit: Office Supplies

DATA RECORD 100 VERSION 4

Edited 1/5/06 8:00:00am
Edited by user: Cheryl
Transaction Date: 1/4/06 [Changed]
Number: 100
Payee: Office Depot
Amount: $150.00
Credit: Checking
Debit: Office Supplies

DATA RECORD 100 VERSION 5

| | |
|---|---|
| Created 1/1/06 8:00:00am<br>Created by user: Tony<br>Transaction Date: 1/1/06<br>Number: 100<br>Payee: Staples<br>Amount: $100.00<br>Credit: Checking<br>Debit: Cost of Goods Sold | Edited 1/2/06 8:00:00am<br>Edited by user: Tony<br>Transaction Date: 1/1/06<br>Number: 100<br>Payee: Staples<br>Amount: $150.00 [Changed]<br>Credit: Checking<br>Debit: Cost of Goods Sold |
| DATA RECORD 100 VERSION 1 | DATA RECORD 100 VERSION 2 |
| Edited 1/3/06 8:00:00am<br>Edited by user: Cheryl<br>Transaction Date: 1/1/06<br>Number: 100<br>Payee: Staples<br>Amount: $150.00<br>Credit: Checking<br>Debit: Office Supplies [Changed] | Edited 1/4/06 8:00:00am<br>Edited by user: Nick<br>Transaction Date: 1/1/06<br>Number: 100<br>Payee: Office Depot [Changed]<br>Amount: $150.00<br>Credit: Checking<br>Debit: Office Supplies |
| DATA RECORD 100 VERSION 3 | DATA RECORD 100 VERSION 4 |

Edited 1/5/06 8:00:00am
Edited by user: Cheryl
Transaction Date: 1/4/06 [Changed]
Number: 100
Payee: Office Depot
Amount: $150.00
Credit: Checking
Debit: Office Supplies

DATA RECORD 100 VERSION 5

FIG. 1B

METHOD AND APPARATUS FOR SELECTING DATA RECORDS FROM VERSIONED DATA

BACKGROUND

When creating a report from versioned data, such as accounting ledgers and audit records, it is often difficult to determine which versions of individual records or ledger entries to include in the report. Moreover, it can be even more difficult to determine how to apply filters and sorting rules to the versioned data to obtain the desired results.

Most existing systems approach this problem in one of two ways: (1) they only apply the filter to the most recent version of a record or a ledger item, and they return the most recent version of a record or a ledger item that passes the filter; or (2) they apply the filter to all versions of a record or a ledger item and return all versions of the record or the ledger item that pass the filter.

Filtering on and returning the most recent version of a record or a ledger item is rather simplistic, and often causes important information not to be displayed to a user. Furthermore, filtering on all versions frequently returns too much information that can be confusing to a user, and still does not provide potentially valuable information to the user that may be contained in versions of a record or a ledger item that did not pass the filter.

SUMMARY

One embodiment of the present invention provides a system that selects data records from versioned data. The system operates by receiving a query from a client to select data records from a data source that match a criteria specified by the query. Note that the data source includes at least one data record which has been modified at least one time, to create multiple versions of the data record. The system performs the query on the data source, which includes performing the query on multiple versions of the data record. Finally, the system returns results of the query to the client.

In a variation on this embodiment, the system performs the query by selecting all versions of the data record if at least one version of the data record matches the criteria.

In a variation on this embodiment, the system performs the query by selecting only versions of the data record that match the criteria.

In a variation on this embodiment, the system performs the query by selecting a latest version of the data record and versions of the data record that match the criteria if at least one version of the data record matches the criteria.

In a variation on this embodiment, the system performs the query by selecting only versions of the data record that changed during a specified period of time and wherein at least one version matches the criteria.

In a variation on this embodiment, the system sorts the results, wherein versions of the data record are grouped together based on the sort criteria data of one version of the data record.

In a variation on this embodiment, the system sorts the results, wherein versions of the data record are not grouped together. A second data record that succeeds a first version of the first data record in the sort order, but precedes a second version of the first data record, is returned between the first version of the first data record and the second version of the first data record.

In a variation on this embodiment, the system returns a cross-reference to the client, wherein the cross-reference provides a link from a version of the data record that meets the criteria to a version of the data record that does not meet the criteria.

BRIEF DESCRIPTION OF THE FIGURES

FIG. 1B illustrates data record versions in accordance with an embodiment of the present invention.

DETAILED DESCRIPTION

Figure 1A:
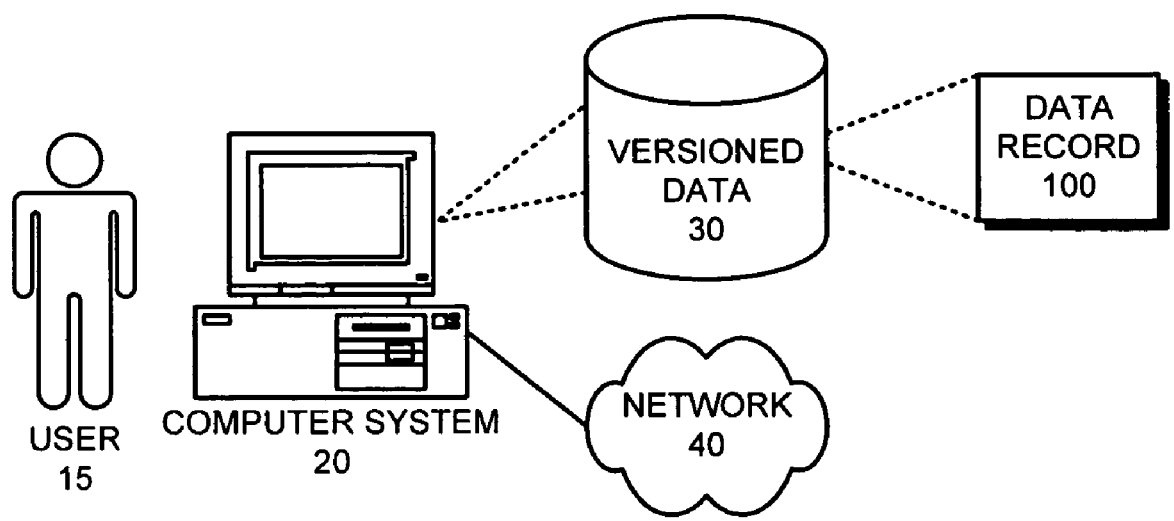
FIG. 1A illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

When a report includes multiple versions of the same item, such as an audit record, there can be a significant amount of ambiguity associated with the sorting and filtering of the versions of the item. It is often not clear which version the system should use for filtering. Furthermore, it is also unclear which version of the entity should be used as the basis of a sort order.

One embodiment of the present invention helps to overcome this ambiguity by providing a system that selects data records from versioned data. The system operates by receiving a query from a client to select data records from a data source that match a criteria specified by the query. Note that the data source includes at least one data record which has been modified at least one time, thereby creating multiple versions of the data record. The system performs the query on the data source, which includes performing the query on multiple versions of the data record. Finally, the system returns results of the query to the client. In one embodiment of the present invention, the entire system, including the client, is incorporated into a single application. However, in another embodiment, the system and the client exist on separate computer systems.

In a variation on this embodiment, the system performs the query by selecting all versions of the data record if at least one version of the data record matches the criteria. In this embodiment, a user can always see the latest version of a data record, even if the latest version does not pass the filter. In addition, the user can easily see the entire history for any data record where at least one version. matches the criteria.

In a variation on this embodiment, the system performs the query by selecting only versions of the data record that match the criteria.

In a variation on this embodiment, the system performs the query by selecting a latest version of the data record and versions of the data record that match the criteria if at least one version of the data record matches the criteria. In this embodiment, the user is presented with all of the versions that meet the criteria, plus the latest version, which can help the user relate the previous versions to the latest version.

In a variation on this embodiment, the system performs the query by selecting only versions of the data record that changed during a specified period of time and wherein at least one version matches the criteria. This variation can be important when trying to locate data records based on knowledge about when the data record was modified. In addition, it can be extremely useful when trying to track down nefarious activities, or when verifying the data for a specific time period during which the security of the data may have been in question.

In a variation on this embodiment, the system sorts the results, wherein versions of the data record are grouped together based on the sort criteria data of one version of the data record. While this variation provides a simple list that might not be in order for each version of the data records, it is very useful to the user because all of the versions of the same data record are grouped together in the report. In the absence of such grouping, it may appear as if there are more data records than there actually are, and it may be confusing to the user.

In a variation on this embodiment, the system sorts the results, wherein versions of the data record are not grouped together. In this variation, a data record that succeeds a first version of the data record in the sort order, but precedes a second version of the data record, is returned in between the first version of the data record and the second version of the data record. This variation may cause some confusion to a user because versions of the same data record can be relatively far apart in the report. However this variation provides a true sorted order for all versions of the data records that meet the criteria.

In a variation on this embodiment, the system returns a cross-reference to the client, wherein the cross-reference provides a link from a version of the data record that meets the criteria to a version of the data record that does not meet the criteria. For example, if the report includes three out of four versions of a particular data record, in may be useful to the user to provide a cross-reference to the one version of the data record which was not included in the report.

Computing Environment

FIG. 1A illustrates a computing environment 10 in accordance with an embodiment of the present invention. Computing environment 10 includes user 15, computer system 20, versioned data 30, network 40, and data record 100.

Computer system 20 can generally include any type of computer system, including, but not limited to, a computer system based on a microprocessor, a mainframe computer, a digital signal processor, a portable computing device, a personal organizer, a device controller, or a computational engine within an appliance.

Network 40 can generally include any type of wired or wireless communication channel capable of coupling together computing nodes. This includes, but is not limited to, a local area network, a wide area network, or a combination of networks. In one embodiment of the present invention, network 40 includes the Internet.

Versioned data 30 can include any type of system for storing data in non-volatile storage. This includes, but is not limited to, systems based upon magnetic, optical, or magneto-optical storage devices, as well as storage devices based on flash memory and/or battery-backed up memory. Versioned data 30 includes at least two versions of at least one data record, such as data record 100. Note that versioned data 30 can be included within computer system 20, or versioned data 30 can be coupled to computer system 20 via network 40. In one embodiment of the present invention, versioned data 30 is included within an application running on computer system 20.

Data Record Versions

FIG. 1B illustrates versions 1 to 5 of data record 100 in accordance with an embodiment of the present invention. In FIG. 1B, data record 100 version 1 is the initially created version of data record 100. As illustrated, Tony initially creates data record 100. After the initial creation of data record 100, Tony changes the amount field of data record 100, thereby creating data record 100 version 2. Next, Cheryl changes the debit field of data record 100 to "Office Supplies" from "Cost of Goods Sold," thereby creating data record 100 version 3. After that, Nick changes the payee field of data record 100 from "Staples" to "Office Depot," thereby creating data record 100 version 4. Finally, Cheryl changes the transaction date field of data record 100, thereby creating data record 100 version 5.

Processing Queries on Versioned Data

Figure 2:
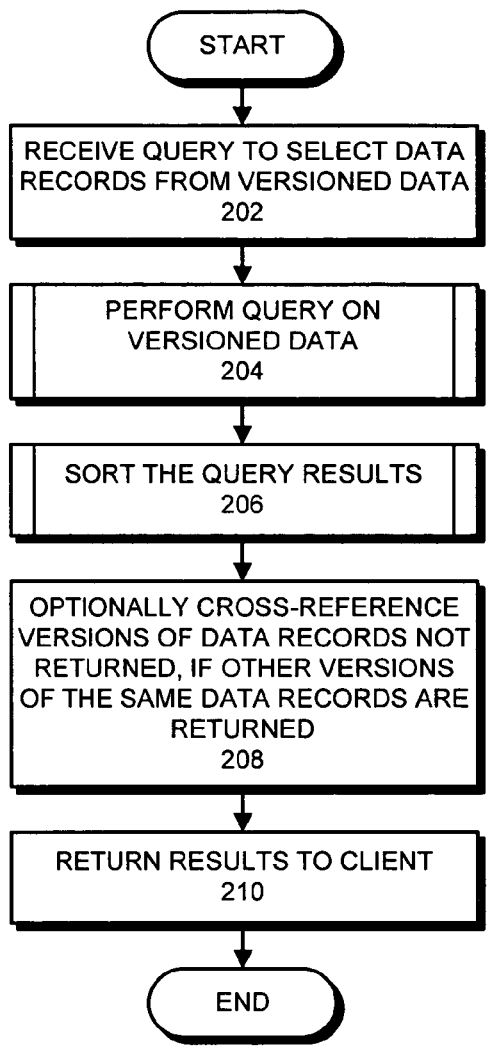
FIG. 2 presents a flowchart illustrating the process of querying versioned data in accordance with an embodiment of the present invention.

FIG. 2 presents a flowchart illustrating the process of querying versioned data 30 in accordance with an embodiment of the present invention. The system starts by receiving a query to select data records from versioned data 30 (step 202). Note that the query may include an indicator specifying the type of filtering and sorting that the system is to perform. Optionally, the filtering and sorting options may be predetermined for the system.

Next, the system performs the query on the versioned data 30 (step 204). Note that this step is described in further detail in the descriptions of FIG. 3A to FIG. 3D.

After the query has been performed, the system may sort the query results (step 206). Note that this step is described in further detail in the descriptions of FIG. 4A and FIG. 4B.

The system may optionally provide cross-references to versions of data records that are not returned if other versions of the same data records are returned (step 208). For example, if the query is selecting all records with a payee of "Staples," the query might return data record 100 versions 1 to 3. Depending on the query type, data record 100 versions 4 and 5 might not be returned because the payee name was changed to "Office Depot" with data record 100 version 4. However, this information might be useful to a user 15 performing the query, so the system may optionally include a cross-reference to data record 100 version 4 and data record 100 version 5 with data record 100 versions 1 to 3. Finally, the system returns the query results to the client (step 210).

Selecting Data Records

FIG. 3A to FIG. 3D present flowcharts illustrating the process of selecting data records in accordance with an embodiment of the present invention. In the embodiment illustrated by FIG. 3A, the system performs the query on versioned data 30 by selecting all versions of the data records, if at least one version of the data records matches the query criteria (step 302). For example, if the query criteria comprises all records edited by Nick, the system selects data record 100 versions 1 to 5 because data record 100 version 3 was edited by Nick.

Figure 3A:
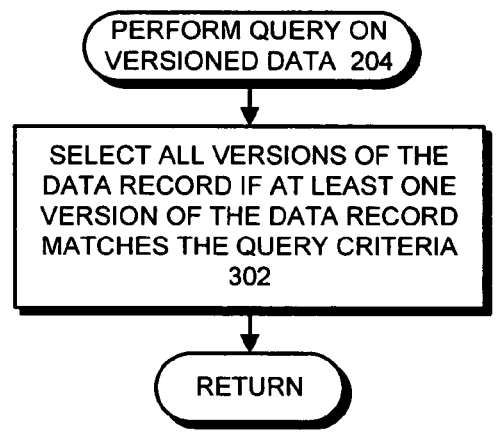
FIG. 3A to FIG. 3D present flowcharts illustrating the process of selecting data records in accordance with an embodiment of the present invention.
Figure 3B:
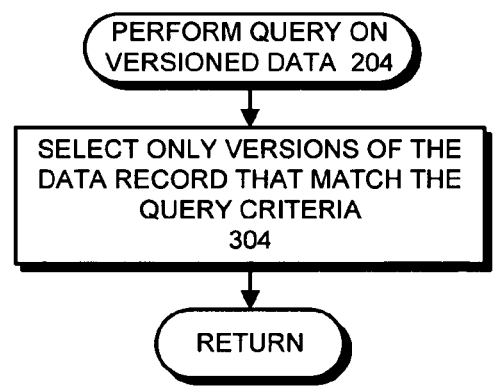

In the embodiment illustrated by FIG. 3B, the system performs the query on versioned data 30 by selecting only data record versions that match the query criteria (step 304). For example, if the query criteria comprises all records for an amount less than $125.00, the system selects data record 100 version 1 as data record 100 version 1 is for the amount of $100.00. Data record 100 versions 2 to 5 are for the amount of $150.00, which does not meet the query criteria, and are not returned.

Figure 3C:
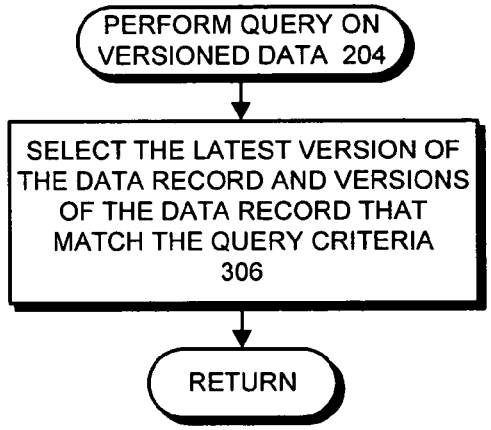

In the embodiment illustrated by FIG. 3C, the system performs the query on versioned data 30 by selecting the latest version of the data records and any version of the data records that matches the criteria (step 306). Considering the previous example, if the query criteria comprises all records for an amount less than $125.00, the system selects data record 100 version 1 because data record 100 version 1 is for the amount of $100.00. However, the system also selects data record 100 version 5, because data record 100 version 5 is the latest version of data record 100, and at least one version of data record 100 (data record 100 version 1) meets the query criteria.

Figure 3D:
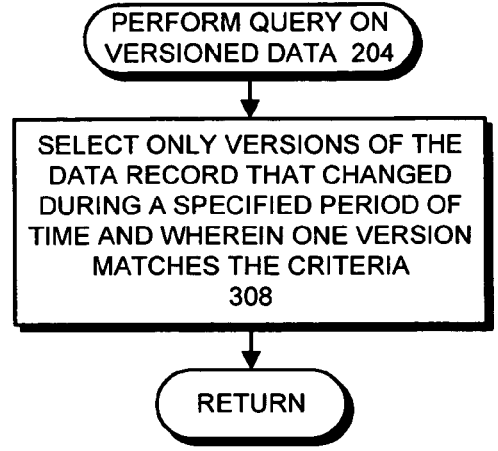

In the embodiment illustrated by FIG. 3D, the system performs the query on versioned data 30 by selecting only versions of the data records that changed during a specified period of time, and wherein at least one version of the data records matches the criteria (step 308). For example, the query criteria might comprise all records with an amount of $150.00 that were created on or between Jan. 1, 2006 and Jan. 3, 2006. This query returns data record 100 versions 1 to 3, because data record 100 version 1 meets the query criteria, and data record 100 versions 2 and 3 were also modified in the specified period of time.

Sorting Data Records

Figure 4A:
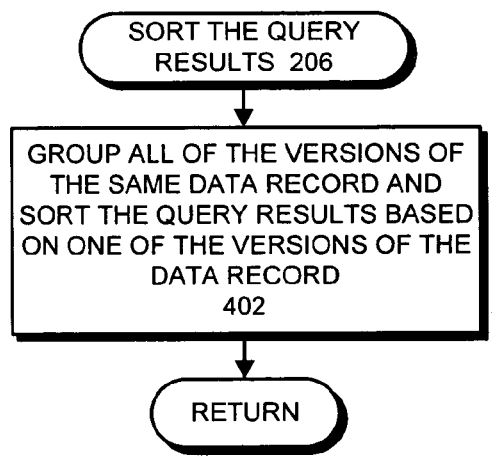
FIGS. 4A and 4B present flowcharts illustrating the process of sorting data records in accordance with an embodiment of the present invention.
Figure 4B:
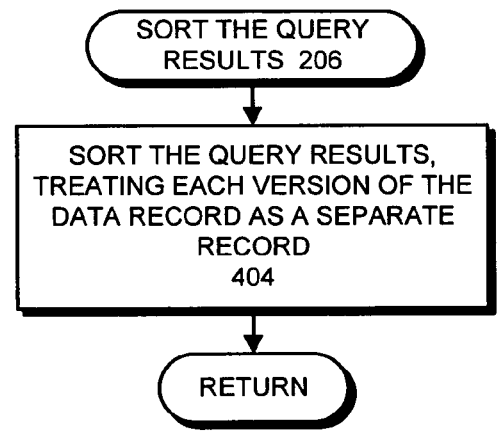

FIGS. 4A and 4B present flowcharts illustrating the process of sorting data records in accordance with an embodiment of the present invention. In the embodiment illustrated by FIG. 4A, the system groups all of the versions of the same data record and sorts the query results based on one of the versions of the data record (step 402). Note that sort order includes both forward and backward ordering. This can be extremely useful to a user 15 who will be reviewing the results of the query.

For example, if the query results included data record 100 versions 1 and 5, and many other data records that happen to fall in between data record 100 versions 1 and 5, the system groups data record 100 versions 1 and 5 together and sorts them based on the data contained in data record 100 version 1 or the data contained in data record 100 version 5, depending upon how the system is configured. In one embodiment of the present invention, when grouping versions of the same data record, the user 15 can choose to sort the group as one entity based on the earliest version of the data record, the latest version of the data record, the version of the data record created at a specific time, or any other criteria for specifying a version of the data record.

In the embodiment illustrated by FIG. 4B, the system does not group versions of the same data record and sorts the query results based on the data of each version of the data record, as if each version is a separate data record (step 404). For example, when sorted by modification time, if the query results included data record 100 versions 1 and 5, and many other data records that happen to fall in between data record 100 versions 1 and 5, the system returns each version of the other data record that occurred after Jan. 1, 2006 at 8:00:00 am and before Jan. 5, 2006 at 8:00:00 am between data record 100 version 1 and data record 100 version 5.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for selecting data records from versioned data, the method comprising:
   receiving a query from a client to select, from a data source, data records that match a query-selection criteria specified by the query, wherein the data source includes at least one data record which has been modified at least one time to create multiple versions of the data record;
   performing the query on multiple versions of the data record;
   determining, by computer, that a first version and a second version of the data record meet the query-selection criteria and a third version of the data record does not meet the query-selection criteria;
   returning the first and second versions of the data record and a second data record that also matches the query-selection criteria as query results;
   sorting the query results such that the second data record is returned between the first and second versions of the data record; and
   returning a link from the first or second version of the data record that meets the query-selection criteria to the third version of the data record that does not meet the query-selection criteria.

2. The method of claim 1, wherein performing the query involves selecting all versions of the data record if at least one version of the data record matches the query-selection criteria.

3. The method of claim 1, wherein performing the query involves selecting only versions of the data record that match the query-selection criteria.

4. The method of claim 1, wherein performing the query involves selecting a latest version of the data record and versions of the data record that match the query-selection criteria if at least one version of the data record matches the query-selection criteria.

5. The method of claim 1, wherein performing the query involves selecting only versions of the data record that changed during a specified period of time and wherein at least one version matches the query-selection criteria.

6. The method of claim 1, wherein returning the results to the client involves sorting the results, wherein versions of the data record are grouped together based on a sort criteria data of one version of the data record.

7. The method of claim 1, wherein returning the results to the client involves sorting the results, wherein versions of the data record are not grouped together, whereby a second data record that succeeds a first version of the data record in the sort order, but precedes a second version of the data record, is returned between the first version of the data record and the second version of the data record.

8. A computer-readable storage medium storing instructions that when executed by a computer cause the computer to perform a method for selecting data records from versioned data, the method comprising:

receiving a query from a client to select, from a data source, data records that match a query-selection criteria specified by the query, wherein the data source includes at least one data record which has been modified at least one time to create multiple versions of the data record;

performing the query on multiple versions of the data record;

determining that a first version and a second version of the data record meet the query-selection criteria and a third version of the data record does not meet the query-selection criteria;

returning the first and second versions of the data record and at least a second data record that also matches the query-selection criteria as query results;, sorting the query results such that the second data record is returned between the first and second versions of the data record; and returning a link from the first or second version of the data record that meets the query-selection criteria to the third version of the data record that does not meet the query-selection criteria.

9. The computer-readable storage medium of claim 8, wherein performing the query involves selecting all versions of the data record if at least one version of the data record matches the query-selection criteria.

10. The computer-readable storage medium of claim 8, wherein performing the query involves selecting only versions of the data record that match the query-selection criteria.

11. The computer-readable storage medium of claim 8, wherein performing the query involves selecting a latest version of the data record and versions of the data record that match the query-selection criteria if at least one version of the data record matches the query-selection criteria.

12. The computer-readable storage medium of claim 8, wherein performing the query involves selecting only versions of the data record that changed during a specified period of time and wherein at least one version matches the query-selection criteria.

13. The computer-readable storage medium of claim 8, wherein returning the results to the client involves sorting the results, wherein versions of the data record are grouped together based on a sort criteria data of one version of the data record.

14. The computer-readable storage medium of claim 8, wherein returning the results to the client involves sorting the results, wherein versions of the data record are not grouped together, whereby a second data record that succeeds a first version of the data record in the sort order, but precedes a second version of the data record, is returned between the first version of the data record and the second version of the data record.

15. An apparatus configured to select data records from versioned data, comprising:

a processor;

a memory;

a receiving mechanism configured to receive a query from a client to select, from a data source, data records that match a query-selection criteria specified by the query, wherein the data source includes at least one data record which has been modified at least one time, to create multiple versions of the data record;

a query mechanism configured to perform the query on multiple versions of the data record;

a determining mechanism configured to determine that a first version and a second version of the data record meet the query-selection criteria and a third version of the data record does not meet the query-selection criteria;

a returning mechanism configured to return the first and second versions of the data record and at least a second data record that also matches the query-selection criteria as query results;

a sorting mechanism configured to sort the query results such that the second data record is returned between the first and second versions of the data record; and a results mechanism configured to return a link from the first or second version of the data record that meets the query-selection criteria to the third version of the data record that does not meet the query-selection criteria.

16. The apparatus of claim 15, wherein the query mechanism is further configured to select all versions of the data record if at least one version of the data record matches the query-selection criteria.

17. The apparatus of claim 15, wherein the query mechanism is further configured to select only versions of the data record that match the query-selection criteria.

18. The apparatus of claim 15, wherein the query mechanism is further configured to select a latest version of the data record and versions of the data record that match the query-selection criteria if at least one version of the data record matches the query-selection criteria.

19. The apparatus of claim 15, wherein the query mechanism is further configured to select only versions of the data record that changed during a specified period of time and wherein at least one version matches the query-selection criteria.

20. The apparatus of claim 15, wherein the results mechanism is further configured to sort the results, wherein versions of the data record are grouped together based on a sort criteria data of one version of the data record.

21. The apparatus of claim 15, wherein the results mechanism is further configured to sort the results, wherein versions of the data record are not grouped together, whereby a second data record that succeeds a first version of the data record in the sort order, but precedes a second version of the data record, is returned between the first version of the data record and the second version of the data record.

* * * * *